US008169775B2

(12) United States Patent
Bortoli et al.

(10) Patent No.: US 8,169,775 B2
(45) Date of Patent: May 1, 2012

(54) COOLING DEVICE FOR A CIRCUIT BREAKER AND CIRCUIT BREAKER COMPRISING SUCH DEVICE

(75) Inventors: Mario Bortoli, Cervignano d'Adda (IT); Alessio Bergamini, Ardesio (IT); Bruno Agostini, Dietikon (CH); Francesco Agostini, Zofingen (CH); Daniel Chartouni, Wettingen (CH); Tilo Buehler, Wettingen (CH)

(73) Assignee: ABB S.p.A., Milan (IT)

( * ) Notice: Subject to any disclaimer, the term of this patent is extended or adjusted under 35 U.S.C. 154(b) by 233 days.

(21) Appl. No.: 12/788,929

(22) Filed: May 27, 2010

(65) Prior Publication Data

US 2010/0302715 A1 Dec. 2, 2010

(51) Int. Cl.
*H02B 1/56* (2006.01)
*H02B 1/04* (2006.01)

(52) U.S. Cl. ......... 361/677; 361/634; 361/656; 200/289

(58) Field of Classification Search .................. 361/619, 361/634, 652–656, 663, 676–678; 200/289
See application file for complete search history.

(56) References Cited

U.S. PATENT DOCUMENTS

| | | | | |
|---|---|---|---|---|
| 3,769,551 | A * | 10/1973 | Corman et al. | 361/676 |
| 4,176,243 | A * | 11/1979 | Kovatch et al. | 174/72 B |
| 6,018,455 | A * | 1/2000 | Wilkie et al. | 361/676 |
| 7,199,318 | B2 * | 4/2007 | Buxton et al. | 200/306 |

* cited by examiner

*Primary Examiner* — Zachary M Pape
(74) *Attorney, Agent, or Firm* — Paul R. Katterle

(57) ABSTRACT

A cooling device for a circuit breaker which comprises a case having a front wall, a rear wall, an upper wall, a lower wall, two flanks, and a first series of side-by-side terminals and a second series of side-by-side terminals that protrude outside from the case for the connection of the circuit breaker with an electrical circuit. The cooling device includes at least one first body made of a thermal conducting material and which has a central portion suitable for being positioned transversally along and facing the first series of terminals so as to absorb heat generated at the first series of terminals, and a first end portion and a second end portion that protrude from the central portion and are configured so as to receive the heat absorbed by the central portion and to diffuse it outside the cooling device itself.teh

15 Claims, 4 Drawing Sheets

COOLING DEVICE FOR A CIRCUIT BREAKER AND CIRCUIT BREAKER COMPRISING SUCH DEVICE

CROSS-REFERENCE TO RELATED APPLICATION

This application claims priority under 35 U.S.C. §119(a)-(d) to Italian Patent Application Number BG2009A000032, filed on May 28, 2009, the entire contents of which are hereby incorporated by reference.

BACKGROUND OF THE INVENTION

The present invention relates to a cooling device for a circuit breaker and to a circuit breaker which comprises such cooling device as well as to a switchboard which comprises such circuit breaker.

As known, low-voltage breaking devices (that is for applications with nominal voltages up to 1000V AC/1500V DC), such as automatic circuit breakers, disconnectors, and contactors, commonly referred to as "switching devices" and hereinafter collectively referred to as circuit breakers, are devices designed for allowing correct operation of specific parts of electrical systems and installed loads.

Such devices are usually installed inside distribution switchboards located in electrical systems. Distribution switchboards comprise suitable cells or cubicles arranged for connecting the devices to the electrical power distribution lines. Distribution lines are normally constituted by systems of conductors, such as bus bars and/or cables. The use of appropriate distribution switchboards, in addition to improving the practicality, ergonomics of use, and the aesthetic appearance of the systems, contributes to the maintenance over the time of adequate safety conditions and correct functionality of all installed parts.

The choice of the devices to be used and their related installation configurations, have to be compatible with the technical characteristics of the distribution switchboard. Such compatibility relates to electrical, dimensional, mechanical, and thermal aspects. For circuit breakers, there are three main installation configurations in the switchboards.

In particular, a first installation configuration for circuit breakers is the so-called fixed execution wherein the electrical terminals of the circuit breaker are directly and stably connected to the conductors of the distribution lines. Such connection is normally done by using clamps or screws.

A second installation configuration for circuit breakers is the so-called plug-in execution, wherein special adapter devices are used which are mechanically connected to the switchboard and stably connected to the conductors of the distribution lines by means of their own electrical terminals; each circuit breaker is mechanically coupled to a corresponding adapter device and, by means of appropriate plug-in electrical terminals, it realizes the electrical connection to the distribution line; the plug-in coupling normally includes mechanisms of the plug-socket type.

A third installation configuration for the circuit breakers is the so-called withdrawable execution; it is substantially an evolution of the preceding removable configuration, wherein accessory elements are added as guiding and/or support and/or movement means for facilitating plugging and withdrawal operations of the circuit breaker.

Of these three installation configurations, the first one is the simplest and least expensive, but it is only suitable for solutions that are definitive and in any case non-flexible; on the other hand, the configurations of the removable and withdrawable type offer a greater flexibility. These in fact allow (once the adapter is secured in the switchboard) very quick and totally safe installation or removal of the circuit breaker and, above all, without having to intervene directly on the distribution lines.

Installations of circuit breakers of the removable and withdrawable type do have at least one drawback compared to the fixed-type installation. In order to realize the plug-in junction (plug/socket), it is in fact necessary to introduce at least one additional electrical connector element. Considering the assembly made up of the circuit breaker and its related adapter, it is in fact possible to schematize each of its poles or branches as an electrical chain constituted by elements placed in series with each other. In such electrical chain, each element contributes to an increase in the electrical resistance (or analogously to a deterioration of the overall conductivity) and thus constitutes a potential source of heat due to the Joule effect.

The undesired heat is generated both in the various conducting sections (for example made of copper) and, above all, at each of the present electrical couplings. The various junctions present, and in particular the plug/socket plugs and the main contacts of the circuit breaker, which by their nature cannot be soldered, in fact introduce other micro-discontinuities where conspicuous localized increases of electrical resistance can be found. In practice, the most critical energy dispersion peaks due to the Joule effect, with consequent undesirable heat production, tend to occur in these areas.

As can be seen, the heat that is generated due to these dispersions contributes to the increase in the temperature of the system consisting of circuit breaker, cubicle and switchboard. But, since the temperature of the circuit breaker and the temperature of the switchboard should be maintained within predefined operating limits, any undesired increase of electrical resistance in the conducting branches of the system consisting of the circuit breaker and its related adapter compels limiting the power that can be drawn by a device. In addition, the temperature can negatively influence the operation of the circuit breakers.

The fraction of the actually usable maximum load (compared to the theoretical nominal capacity) is generally expressed in the form of "derating" coefficients that are based on the overall effective conditions of installation. Such installation conditions take account of the combination of the characteristics of the circuit breaker, the adapter, the cubicle, the switchboard, the external environment, etc.

Besides the constraints associated with derating, it is therefore desirable to maintain the operating temperature of the circuit breakers at low levels; it is well known in fact that the higher is the operating temperature, the lower is the life span of the circuit breaker (or of its more sensitive components).

Many solutions have been introduced by various manufacturers in order to reduce the electrical resistance of the poles of the circuit breakers and the electrical contact resistance of the electrical coupling between the circuit breaker and the adapter, and/or in order to improve the overall thermal efficiency of the switchboard.

Although these known solutions certainly provide some technical benefits, there is room and necessity for further improvements.

SUMMARY OF THE INVENTION

Therefore, the present invention is directed toward addressing the aforementioned problems and providing a solution that makes it possible to improve the cooling of the circuit breaker, as well as the electrical switchboard within which the circuit breaker is disposed.

The present invention is directed toward a cooling device for a circuit breaker which includes a case having a front wall, a rear wall, an upper wall, a lower wall, two flanks, and a first series of side-by-side terminals and a second series of side-by-side terminals that extend outside of the case for the connection of the circuit breaker with an electrical circuit. The cooling device includes at least one first body made of a material that is thermal conducting and configured so as to have a central portion suitable for being positioned transversally along and facing said first series of terminals so as to absorb the heat generated at said first series of terminals, and a first end portion and a second end portion that extend from said central portion and are configured so as to receive the heat absorbed by said central portion and to diffuse it to the exterior of the cooling device itself.

BRIEF DESCRIPTION OF THE DRAWINGS

Further characteristics and advantages will become more apparent from the description of some preferred but not exclusive embodiments of the device according to the invention, illustrated only by way of non-limiting examples with the aid of the accompanying drawings, wherein.

DETAILED DESCRIPTION OF ILLUSTRATIVE EMBODIMENTS

Figure 1:
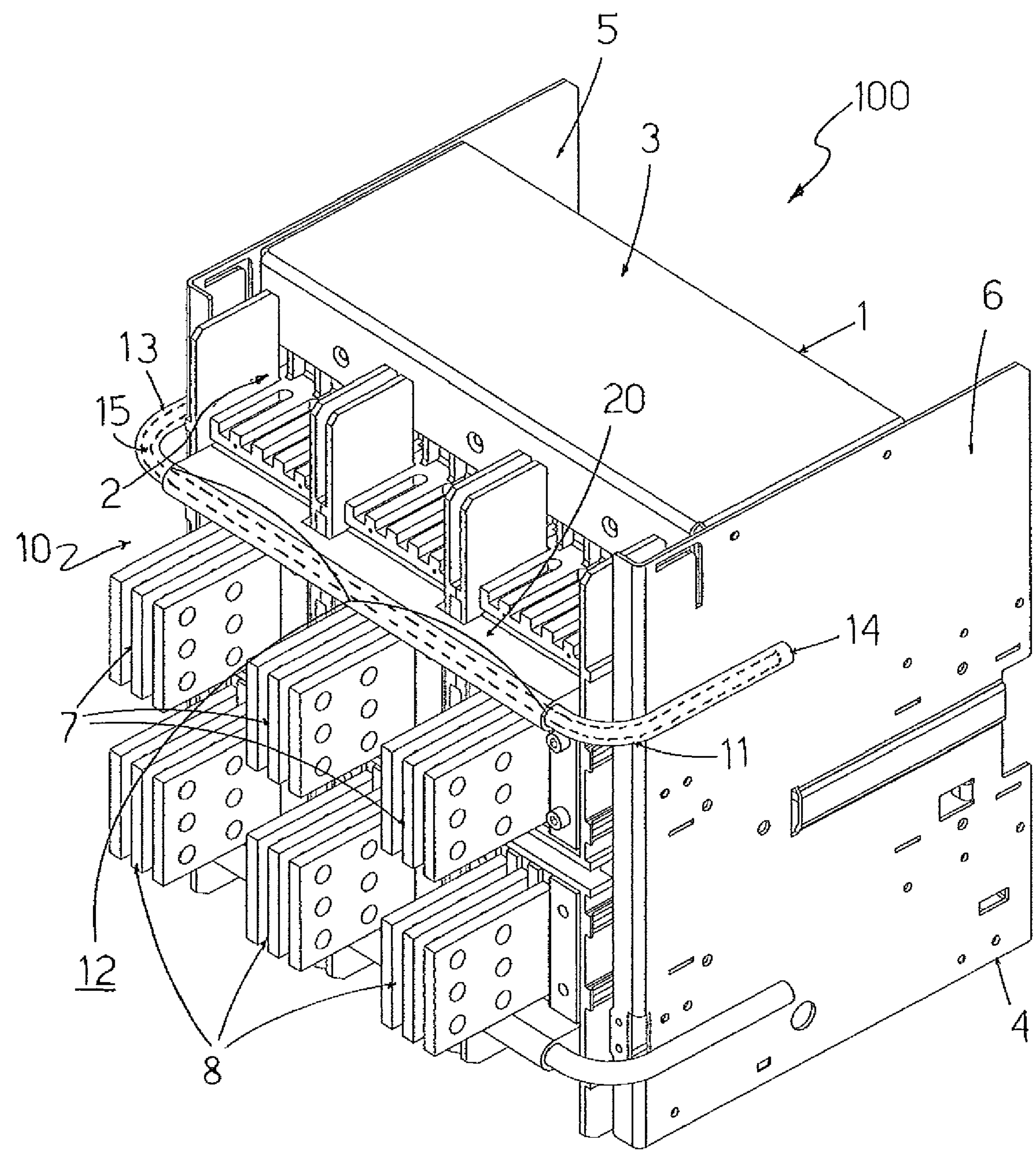
FIG. 1 is a perspective view representing a circuit breaker coupled with components of the cooling device according to the invention, in accordance with one possible embodiment.

In FIGS. 1-4 there is illustrated a circuit breaker 100, for example, a low-voltage one, viewed from the rear, which comprises a case constituted by a single piece or in multiple elements assembled together, having a front wall 1, a rear wall 2, an upper wall 3, a lower wall 4, and two flanks 5 and 6.

According to embodiments which are well known in the art and, therefore, not described here in detail, inside the case the breaking part of the circuit breaker is housed, which usually comprises, for each pole or phase of the electrical circuit, inside which the circuit breaker is inserted, an arc chamber inside which a pair of electrical contacts are positioned that couple to/separate from each other; moreover, the circuit breaker 100 can be realized in a fixed execution, that is, in a single body, or in a withdrawal or removable (plug-in) execution, wherein the part (of the type illustrated in the figures) containing the breaking components is couplable to an adapter in a separable manner.

As illustrated in the figures, a first series of side-by-side terminals 7 and a second series of side-by-side terminals 8 that lean forward outside of the case for the connection of the circuit breaker with an electrical circuit, emerge from the case of the circuit breaker.

Advantageously, the cooling device according to the invention, overall indicated by the reference number 10 comprises at least one first body 11 made of thermal conducting material and configured in such a way as to have a central portion 12 suitable for being positioned transversally along the first series of terminals 7 and facing them in such a way as to absorb the heat generated at the first series of terminals 7 themselves. The body 11 also comprises a first end portion 13 and a second end portion 14 which lean forward from opposite parts of the central portion 12 and are configured in such a way as to receive the heat absorbed by the central portion 12 and to diffuse it to the outside of the cooling device itself.

According to one possible embodiment illustrated in the appended figures, the first thermal conducting body 11 is made completely of a thermally and electrically conducting material, such as copper, aluminium or any other commercially available material suitable for the purpose, and the cooling device 10 comprises a collector body 20 made of a material that is thermal conducting and electrically insulating, such as ceramics, for example, or a plastic material resistant to high temperatures, such as thermoplastic material, for example, like PolyPhenyl Sulphide (PPS) charged with ceramic powders like Bor Nitride (BN); such a collector body 20 is able to be connected to the thermal conducting body 11 in such a way as to electrically insulate at least the central portion 12 from energized parts of the circuit breaker, and can be shaped variously as a function of the applications and of the shape of the body 11 to which it is to be coupled.

In practice, the body 20 covers the central portion of the body 11 like an electrically insulating sheath; furthermore, as illustrated, for example, in FIG. 1, the body 20 can be configured in such a way as to permit the coupling with the rear wall 2 of the circuit breaker, for example, according to plug-in configurations, or using suitable fastening means not illustrated in the figure, such as removable screws, for example.

According to another possible embodiment, at least one part of the central portion 12 is made of material that is thermal conducting but electrically insulating, such as ceramics, for example, or a plastic material resistant to high temperatures, or can also be made completely of a material that is thermal conducting but electrically insulating.

Preferably, the thermal conducting body 11 comprises at least one hermetically sealed cavity 15 (indicated by dashed lines only in FIG. 1), which contains a cooling fluid; the hermetically sealed cavity 15 has a first thermal exchange surface positioned at the central portion 12, and two other thermal exchange surfaces at the two ends 13 and 14.

Preferably, the sealed cavity 15 comprises a small quantity of vaporizable liquid, such as water, for example.

Preferably, the walls of the sealed cavity 15 have porous, rough, or ribbed internal surfaces.

Advantageously, the device 10 comprises a first exchanger element 30 and a second exchanger element 30 (of which only one is visible in the figures) that are connected, respectively, to the first end portion 13 and to the second end portion 14 of the thermal conducting body, respectively; the two exchangers 30 are suitable for being operatively associated with the flanks of the circuit breaker (or of the fixed part of the circuit breaker) as will become apparent more in detail from the following description.

Figure 2:
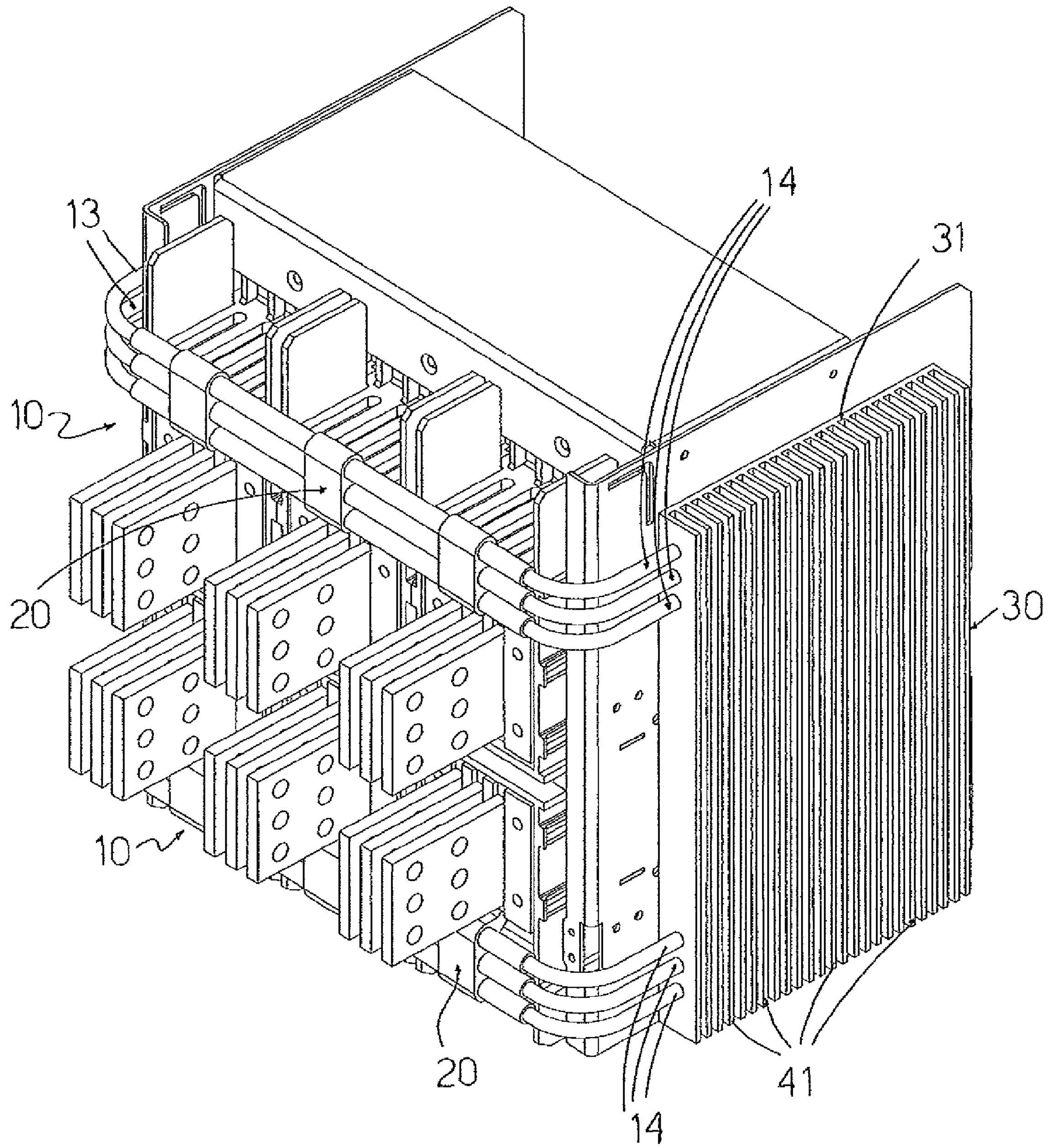
FIG. 2 is a perspective view representing a circuit breaker coupled with a cooling device according to the invention, in accordance with one possible embodiment.
Figure 3:
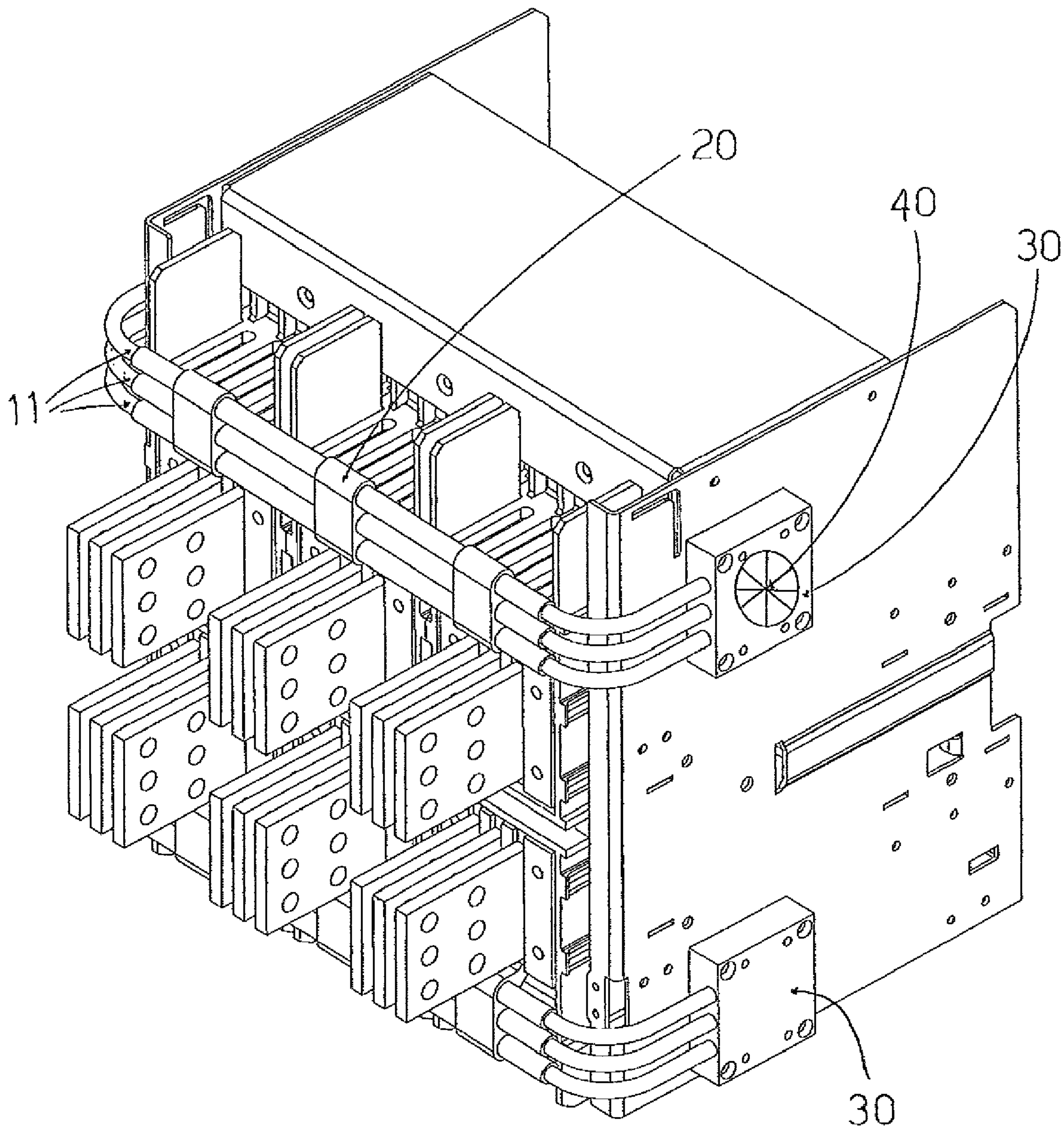
FIG. 3 is a perspective view representing a circuit breaker coupled with a cooling device according to the invention, in accordance with a further embodiment.
Figure 4:
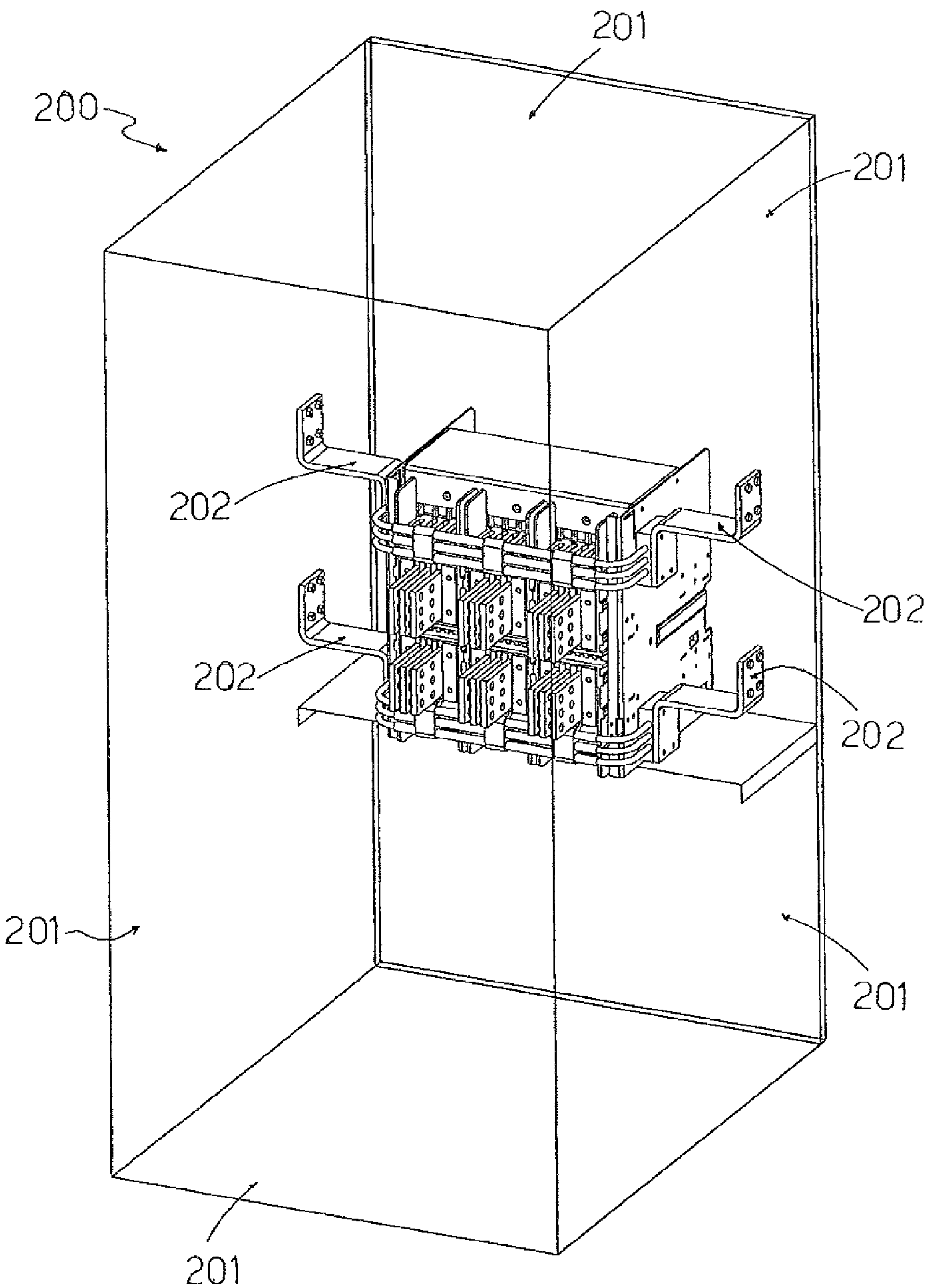
FIG. 4 illustrates an electrical switchboard housing a circuit breaker coupled to a cooling device according to the invention.

The thermal conducting body 11 preferably comprises at least one hermetically sealed hollow tubular element; in particular, as illustrated in FIGS. 2-4, it is foreseen the use of a plurality of hermetically sealed hollow tubular elements, such as three, for example, which are positioned parallel to each other and are held together in a single structure by the collector body 20.

The inside walls of the various tubular elements thus constitute surfaces delimiting the respective cavities 15, each of which contains the cooling fluid.

In particular, in the embodiments illustrated in the figures, such hermetically sealed hollow tubular elements, whether one or more, each exhibit a U shape having a central portion 12 intended to be facing the first series of side-by-side terminals 7, and two curved end portions 13 and 14 that lean forward from the central portion 12 to the external surface of the flanks 5 and 6 of the circuit breaker (or of the fixed part of the circuit breaker). The end portion 13 is connected to the first exchanger element 30, and the second end portion 14 is connected to the second exchanger 30.

In the embodiment illustrated in FIG. 2, the two exchangers 30 are both constituted by a radiant element (only one is visible on the flank 6) connected at the corresponding end portion 13, 14 of each of the U-shaped tubular elements; as illustrated, in this case, the two radiant elements have a common wall 31 from which a plurality of the radiant fins 41 lean forward. The radiant elements 30 can rest or be solidly connected, e.g., screwed on, to the corresponding flank 5, 6 of the circuit breaker (or of the fixed part of the circuit breaker).

In the embodiment illustrated in FIGS. 3 and 4, the two exchangers 30 are both constituted by a plate (also in this case, only one is visible on the flank 6) connected at the corresponding end portion 13, 14 of each of the U-shaped tubular elements; moreover, the two plates 30 can be supported or solidly connected, e.g. screwed on, each to the corresponding flank 5, 6 of the circuit breaker (or of the fixed part of the circuit breaker).

Advantageously, at least one of the two plates 30, 31, preferably both, is coupled to a fan, which is schematically indicated in FIG. 3 by the reference number 40.

In practice, device 10 according to the invention comprises a central part (constituted by the central portion 12 by the various tubular elements used and by the collector 20 that might be used) which acts as a collector of heat at the terminals 7, which represent a particularly critical point for the heating; the central parts of the sealed cavities 15 absorb (directly or indirectly) heat coming from this zone and convey it to the two end portions 13 and 14, which in turn transmit it to the exchangers 30 (whether they be plates or radiators). The two exchangers 30 act as diffusers and transmit heat (directly or indirectly) toward the exterior of the device itself.

In particular, in the illustrated embodiments, the exchangers 30 transfer heat to the flanks 5 and 6, which themselves function, hence, as additional radiators; any possible use of fans 40 makes it possible to further improve the subtraction of heat from the area of terminals 7.

In conclusion, this is a thermal circuit that has: a warmer section in the central area, which faces the terminals 7, that is with a warm part of the circuit breaker; and a "cooler" section, which is placed at the ends facing the flanks of the circuit breaker, wherein the temperature does not have a particular effect on the operation of the circuit breaker. The warmer section acts as an evaporator for the cooling fluid placed inside the sealed cavity, while the cooler section acts as a condenser; basically, a "thermal short circuit" is achieved between the two sections of the chain characterized by very different temperatures, wherein the device 10 absorbs heat at its warmer section, transferring it to the cooler section, which hence transfers it to the areas in contact therewith.

It is noted that a thermal power of some tens of Watts (as occurs, for example, in the typical case of a circuit breaker operating at full load) can be definitely critical if maintained inside the circuit breaker, while in itself it is insignificant once it is extracted toward the flanks of the circuit breaker (or of the fixed part of the circuit breaker). In fact, the thermal capacity of the flanks of the circuit breaker (or of the fixed part of the circuit breaker) associated with the substantial radiant surfaces in practice renders negligible this contribution of heat. Moreover, the sheet metal flanks are generally rather robust and do not present risks of premature aging because of modest heating phenomena.

It has been observed in practice how the device 10, according to the invention, allows to accomplish the intended scope by providing some significant improvements with regard to the known solutions; in fact, the cooling device 10 allows to remove a substantial quantity of heat from delicate parts of the circuit breaker, such as the terminals, and to diffuse it toward areas substantially uninfluential for the same.

It should be noted that the device 10 has a simple structure and can be quickly and effectively installed without the need for special prearrangements, and can be sold as a kit to be applied to any type of circuit breaker, in particular a low-voltage one that would require its usage.

Hence, another object of the present invention is constituted by a circuit breaker for an electrical circuit comprising a cooling device 10 according to what was previously described and defined in the appended claims.

In particular, according to what was previously described, the cooling device 10 is preferably connected in a removable way, e.g., toward the rear area of the body of the circuit breaker itself; moreover, as it is evident from the previous description and illustrated in the appended drawings, what is indicated for the device 10 with regard to the first series of terminals 7 is repeatable in an entirely analogous manner for the second series of terminals 8. In this case, in fact, a second body 11 having in the illustrated case in point one or more hermetically sealed and U-shaped hollow tubular elements, associated with the related collector 20 can be used; the tubular elements can be connected to the same radiant elements 30 (see FIG. 2) or to further radiant elements 30 (see FIG. 3).

In this way, all conditions being equal, the use of a device 10 makes it possible to have a circuit breaker with a rating higher than an identical circuit breaker which is not provided with it.

In addition, such a device 10 can be used together with a circuit breaker for application in any type of electrical switchboard in retrofitting operations, for example, or can be installed inside a switchboard by simply associating it with an already existing circuit breaker for connecting it to an associated electric line. Therefore, another object of the present invention is constituted by an electrical switchboard 200 illustrated, for example, in FIG. 4, having a plurality of walls 201 that define an internal volume intended to house one or more electrical devices, characterized in that it comprises a circuit breaker 20 according to what was previously described and defined in the appended claims. In particular, in the example illustrated in FIG. 4, the use of one or more shaped thermal conducting elements 202 is provided. Each shaped element 202 comprises a first end operatively coupled to a corresponding wall 201 of the switchboard, and a second end operatively coupled to the corresponding end portion 13, or 14 of the conducting body 11; for example, such a second end can be screwed into a corresponding exchanger 30. With such a solution, beyond using the elements 202 as radiators, the walls of the switchboard can also be used as radiant elements.

The device 10 thus conceived is susceptible to numerous changes and variants, all of which are in the scope of the inventive concept; additionally, all details can be replaced by other equivalent technical elements. For example, the number of tubular elements as well as their configuration can be varied; or the collector 20 can be shaped/dimensioned in a completely different manner. The number, shape and positioning of the exchangers can be varied, etc. Moreover, it is possible to carry out any combination of the illustrative examples described above. In practice, the materials, as well as the dimensions, can be of any kind depending on the requirements and state of the art.

What is claimed is:

1. A cooling device for a circuit breaker which comprises a case having a front wall, a rear wall, an upper wall, a lower wall, two flanks, and a first series of side-by-side terminals and a second series of side-by-side terminals that protrude outside from the case for the connection of the circuit breaker with an electrical circuit, the cooling device comprising:

at least one first body made of a thermal conducting material and configured so as to have a central portion suitable for being positioned transversally along and facing said first series of terminals so as to absorb heat generated at said first series of terminals, and a first end portion and a second end portion that protrude from said central portion and are configured so as to receive the heat absorbed by said central portion and to diffuse it outside the cooling device itself.

2. A device according to claim 1, wherein said first thermal conducting body is made completely of a thermally and electrically conducting material and in that it comprises at least one collector body made of material that is thermal conducting and electrically insulating, which is suitable for being connected to the first thermal conducting body so as to electrically insulate at least the central portion.

3. A device according to claim 1, wherein at least one part of the central portion of said first thermal conducting body is made of electrically insulating material.

4. A device according to claim 2, wherein said first thermal conducting body is made completely of a thermal conducting and electrically insulating material.

5. A device according to claim 1, wherein said first thermal conducting body comprises at least one hermetically sealed cavity that contains a cooling fluid.

6. A device according to claim 1, wherein said first thermal conducting body comprises a first exchanger and a second exchanger that are connected, respectively, to the first end portion and to the second end portion of said first thermal conducting body, said first and second exchangers being suitable for being operatively associated with the flanks of the circuit breaker.

7. A device according to claim 6 wherein said first thermal conducting body comprises at least one hermetically sealed hollow tubular element containing a cooling fluid.

8. A device according to claim 7, wherein said hermetically sealed hollow tubular element has a U shape having a central portion intended to be facing said first series of side-by-side terminals and two curved end portions that protrude from said central portion toward the external surface of the flanks of the circuit breaker and are connected to said first exchanger and to said second exchanger, respectively.

9. A device according to claim 8, wherein said first exchanger and second exchanger comprise a first plate and a second plate that are connected to the two corresponding curved end portions of the hermetically sealed hollow tubular element.

10. A device according to claim 9, wherein at least one of said first plate and second plate is coupled to a fan.

11. A device according to claim 8, wherein said first exchanger and said second exchanger comprise a first radiant element and a second radiant element that are connected to the two corresponding end portions of the hermetically sealed hollow tubular element, said first and second radiant elements comprising a common wall from which a plurality of radiant fins protrude from.

12. A circuit breaker comprising:

a case having a front wall, a rear wall, an upper wall, a lower wall, two flanks and a first series of side-by-side terminals and a second series of side-by-side terminals that protrude outside from the case for the connection of the circuit breaker with an electrical circuit; and a cooling device comprising at least one first body made of a thermal conducting material and configured so as to have a central portion suitable for being positioned transversally along and facing said first series of terminals so as to absorb heat generated at said first series of terminals, and a first end portion and a second end portion that protrude from said central portion and are configured so as to receive the heat absorbed by said central portion and to diffuse it outside the cooling device itself.

13. A circuit breaker according to claim 12, wherein said cooling device is removably connected to the body of the circuit breaker itself.

14. A circuit breaker according to claim 12, wherein said cooling device comprises a second body made of thermal conducting material and configured in such a way as to have a central portion suitable for being positioned transversally along and facing said second series of terminals so as to absorb heat generated at said second series of terminals, and a first end portion and a second end portion that protrude from said central portion and are configured in such a way as to receive the heat absorbed by said central portion and diffuse it outside the cooling device itself.

15. An electrical switchboard comprising:

a cubicle having a plurality of walls that define an internal volume intended to house one or more electrical devices; and a circuit breaker comprising:

a case having a front wall, a rear wall, an upper wall, a lower wall, two flanks and a first series of side-by-side terminals and a second series of side-by-side terminals that protrude outside from the case for the connection of the circuit breaker with an electrical circuit; and a cooling device comprising at least one first body made of a thermal conducting material and configured so as to have a central portion suitable for being positioned transversally along and facing said first series of terminals so as to absorb heat generated at said first series of terminals, and a first end portion and a second end portion that protrude from said central portion and are configured so as to receive the heat absorbed by said central portion and to diffuse it outside the cooling device itself.

* * * * *